(12) United States Patent
Akimoto et al.

(10) Patent No.: US 10,666,855 B2
(45) Date of Patent: May 26, 2020

(54) ELECTRONIC EQUIPMENT

(71) Applicant: CANON KABUSHIKI KAISHA, Tokyo (JP)

(72) Inventors: Takahiro Akimoto, Kawasaki (JP); Jun Kamiya, Kawasaki (JP); Haruhisa Ueda, Tokyo (JP); Takuma Iwagami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/453,896

(22) Filed: Jun. 26, 2019

(65) Prior Publication Data

US 2020/0007748 A1  Jan. 2, 2020

(30) Foreign Application Priority Data

Jun. 29, 2018 (JP) ................................ 2018-125511

(51) Int. Cl.
*H04N 5/232* (2006.01)
*G06F 3/044* (2006.01)

(52) U.S. Cl.
CPC ......... *H04N 5/23216* (2013.01); *G06F 3/044* (2013.01); *H04N 5/23293* (2013.01)

(58) Field of Classification Search
CPC ............................ H04N 5/23216; G06F 3/044
See application file for complete search history.

(56) References Cited

U.S. PATENT DOCUMENTS

2014/0247246 A1\* 9/2014 Maus .................... G06F 1/1632
  345/174
2017/0177140 A1\* 6/2017 Lee ......................... G06F 21/32

FOREIGN PATENT DOCUMENTS

JP  2008-236765 A  10/2008
JP  2013-025503 A   2/2013

\* cited by examiner

*Primary Examiner* — Christopher K Peterson
(74) *Attorney, Agent, or Firm* — Canon U.S.A., Inc. IP Division

(57) ABSTRACT

Electronic equipment includes a first operating member having a detecting unit to detect touch and slide operations. Where a detecting unit touch detecting face is touched in the touch operation over a first and a second predetermined area, larger than the first predetermined area, or less, a first function is executed. Where the touch detecting face of the detecting unit is touched in the touch operation over more than the second predetermined area, a second function is executed. The touch detecting face is divided into a first, a second, and a third touch detecting face, in that order in a direction of the slide operation. A relation of $1.4 \leq W1/W2 \leq 6.0$ is satisfied. W1 represents a length of the touch detecting face in the direction of the slide operation, and W2 represents a length of the second touch detecting face in the direction of the slide operation.

7 Claims, 11 Drawing Sheets

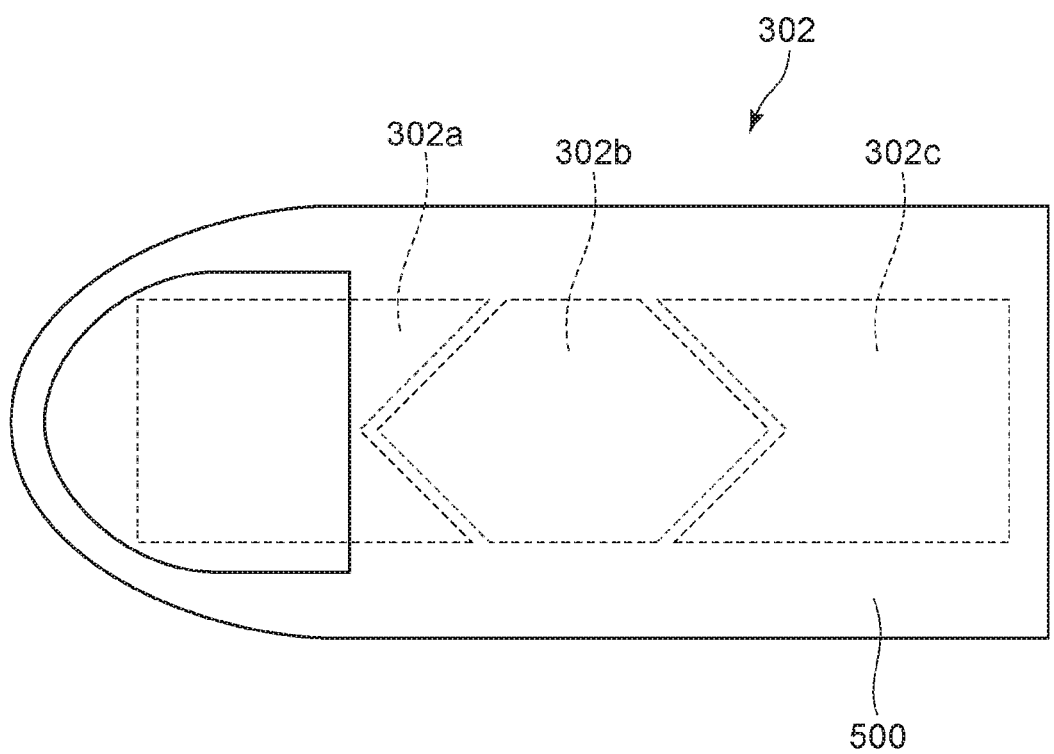

ELECTRONIC EQUIPMENT

BACKGROUND

Field

The present disclosure relates to electronic equipment having touch functions, and relates to the size of a detecting face where touch detection is performed.

Description of the Related Art

Conventionally, imaging apparatuses have been provided with operating members for selecting setting items, such as directional pads, dials, and so forth. In recent years, there has been an increase in products that have a touch panel as a display device, and users can select/set items simply by touching displayed setting items. There are also products that have a touch sensor as an operating member, which is anticipated to serve as a user interface for shooting moving images with imaging apparatuses.

Performing settings while shooting moving images using conventional mechanical operating members results as operating sounds being recorded as noise, but operating sounds to be recorded can be reduced by operating members using touch sensors.

There are various types of touch panels and touch sensors, such as capacitive, resistive film, optical, and so forth, each having advantages and disadvantages, and have been implemented in a broad range of usages. Out of these, capacitive touch panels and touch sensors are configured to detect with high precision, and have been employed in many devices.

Touch detection is performed in capacitive touch panels and touch sensors by providing a touch detection electrode for touch detection. Japanese Patent Laid-Open No. 2008-236765 describes disposing a touch operating member at the perimeter of a display screen. Technique is disclosed therein where this works towards addressing an issue where a finger comes into direct contact with the touch screen when in use and soils the screen, as well as realizing reduced size and reduced thickness of the equipment itself due to reduction in mechanical operating members, and improving operability.

In Japanese Patent Laid-Open No. 2013-025503, an inputting pattern indicating a touch input position is displayed at an edge of a display device to be smaller in size than an area of a finger, and also an electrode for touch detection is provided on the outer side of a display unit, whereby touch is performed without providing a touch detecting unit to the display unit.

However, in the conventional technique disclosed in the aforementioned Japanese Patent Laid-Open No. 2008-236765, a touch operating member is disposed on an outer cover at the perimeter of a display unit, but there is no description of the size of a touch detection region.

Japanese Patent Laid-Open No. 2013-025503 compares an inputting pattern indicating the touch input position with the area of a finger, but the size of the electrodes that perform touch detection is not clear.

The larger the size of the electrodes that perform touch detection is, the operability when performing tap operations and slide operations increases, but a large electrode size also increases the size of the camera. There also has been proposed an operation of full-area pressing of touching the entirety of electrodes, besides touch operations and slide operations. However, operability for full-area pressing operations becomes deteriorated if the electrode size is large.

On the other hand, the smaller the electrode size is, the size of the camera is reduced and full-area pressing operability improves, but operability becomes deteriorated for tap operations and slide operations. Also, while full-area pressing where all electrodes are touched becomes easier, there may be issues where normal tap operations are erroneously sensed as being full-area pressing. Accordingly, the size of electrodes used for touch detection is extremely important. An ideal electrode size is a size with which only a part of electrodes where pressing is desired is touched when performing tap operations, and is also a size with which all electrodes can be easily touched when performing full-area pressing.

SUMMARY

It has been found desirable to provide electronic equipment with excellent operability for tap operations and slide operations.

According to an aspect of the present disclosure, electronic equipment includes a first operating member having a detecting unit configured to detect a touch operation and a slide operation, wherein, in a case where a touch detecting face of the detecting unit is touched in the touch operation over a first predetermined area and a second predetermined area or less, a first function is executed, wherein the second predetermined area is larger than the first predetermined area, wherein, in a case where the touch detecting face of the detecting unit is touched in the touch operation over more than the second predetermined area, a second function that differs from the first function is executed wherein the touch detecting face of the detecting unit is divided into a first touch detecting face, a second touch detecting face, and a third touch detecting face, in that order in a direction of the slide operation, and wherein a relation of $1.4 \leq W1/W2 \leq 6.0$ is satisfied, where W1 represents a length of the touch detecting face of the detecting unit in the direction of the slide operation, and W2 represents a length of the second touch detecting face in the direction of the slide operation.

Further features of the present disclosure will become apparent from the following description of exemplary embodiments with reference to the attached drawings.

BRIEF DESCRIPTION OF THE DRAWINGS

FIG. 7 is a conceptual diagram of full-area pressing operations according to the first example.

DESCRIPTION OF THE EMBODIMENTS

Figure 1A:
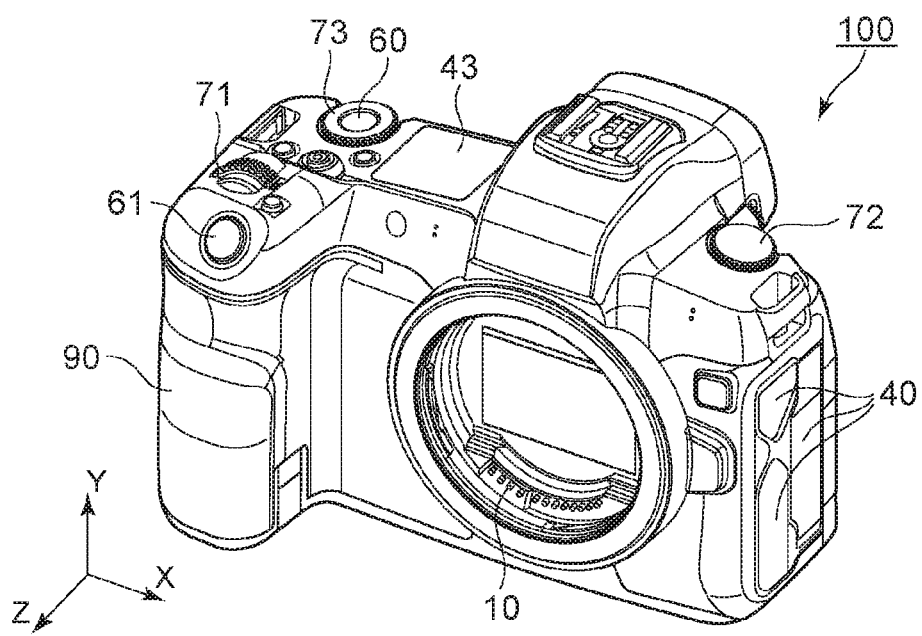
FIGS. 1A and 1B are external views of a digital camera.
Figure 1B:
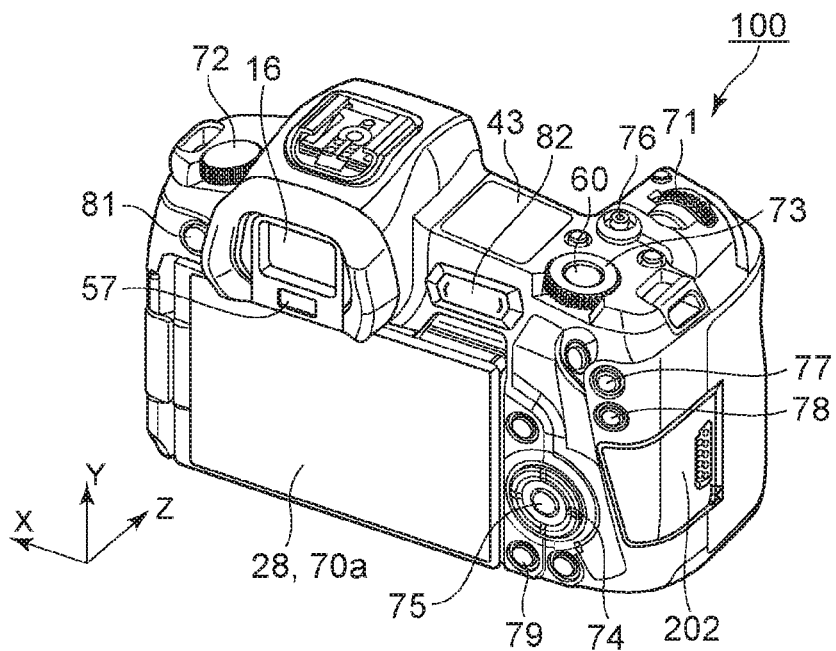

An embodiment of the present disclosure will be described with reference to the drawings. FIGS. 1A and 1B are external views of a digital camera 100 serving as an example of an apparatus to which the present disclosure can be applied. FIG. 1A is a frontal perspective view of the digital camera 100, and FIG. 1B is a rear perspective view of the digital camera 100. A display unit 28 in FIG. 1B is a display unit provided to the rear face of the camera, to display images and various types of information.

A touch panel 70a can detect touch operations made as to the display face (operating face) of the display unit 28.

A non-viewfinder display unit 43 is a display unit provided on the upper face of the camera, and displays various camera setting values such as shutter speed, aperture, and so forth.

A shutter button 61 is an operating unit for giving a shooting instruction. A mode selection switch 60 is an operating unit for switching among various types of modes.

A terminal cover 40 is a cover that protects a connector (omitted from illustration) for a connection cable such as a connection cable connecting external equipment and the digital camera 100.

A main electronic dial 71 is a rotational operating member included in an operating unit 70. Setting values such as shutter speed, aperture, and so forth, can be changed, for example, by rotating this main electronic dial 71.

A power source switch 72 is an operating member that switches the power source for the digital camera 100 on and off.

A sub-electronic dial 73 is a rotational operating member included in the operating unit 70, and can be used for moving selection frames, image feeding, and so forth.

A directional pad 74 is included in the operating unit 70, and can be pressed at upper lower, left, and right portions (four-directional key). Operations can be performed in accordance with the portion of the directional pad 74 that has been pressed.

A set button 75 is a press button that is included in the operating unit 70, and primarily is used for determining selected items.

A moving image button 76 is used to instruct starting and stopping of shooting (recording) moving images. An automatic exposure (AE) lock button 77 is included in the operating unit 70. The exposure state can be fixed by pressing the AE lock button 77 in a shooting standby state.

A zoom button 78 is an operating button included in the operating unit 70, for turning a zoom mode on and off for live view (LV) display in a shooting mode. Once the zoom mode is turned on, the LV image can be zoomed in and zoomed out by operating the main electronic dial 71. In playback mode, the zoom button 78 serves as an enlarging button to enlarge the playback image to a larger enlargement ratio.

A playback button 79 is an operating button included in the operating unit 70, for switching between the shooting mode and playback mode. When the playback button 79 is pressed in the shooting mode, the mode transitions to the playback mode, and the newest image out of images recorded on a recording medium 200 can be displayed on the display unit 28.

A menu button 81 is included in the operating unit 70. When the menu button 81 is pressed, a menu screen enabling various types of settings is displayed on the display unit 28. The user can intuitively perform various types of settings using the menu screen displayed on the display unit 28, and the directional pad 74 and set button 75.

A touch bar 82 is a linear touch operating member (line touch sensor) that can accept touch operations. The touch bar 82 is disposed at a position so as to be operable by the thumb of the right hand grasping a grip portion 90. The touch bar 82 can accept tap operations (an operation of touching, and then releasing the thumb without moving within a predetermined amount of time), slide operations (an operation of touching, and then moving the touch position while still in contact) to the left or right, and so forth. Note that the touch bar 82 is a separate operating member from the touch panel 70a, and does not have display functions.

A communication terminal 10 is a communication terminal for the digital camera 100 to communicate with the lens side (detachable).

An eyepiece 16 is an eyepiece for a direct viewfinder (a viewfinder that is directly looked through). The user can confirm by viewing images displayed on an internal electronic viewfinder (EVF) 29 through the eyepiece 16.

A viewfinder proximity detecting unit 57 is a viewfinder proximity sensor that detects whether the eye of the photographer is in the proximity of the eyepiece 16.

A cover 202 is a cover for a slot accommodating the recording medium 200. The grip portion 90 is a holding portion that has a shape enabling the user to easily grip the digital camera 100 in the right hand.

The shutter button 61 and main electronic dial 71 are disposed at positions so as to be operable by the index finger of the right hand in a state where the grip portion 90 is being gripped by the user using the little finger, ring finger, and middle finger of the right hand to hold the digital camera 100. The sub-electronic dial 73 and touch bar 82 are disposed at positions so as to be operable by the thumb of the right hand in the same state.

Figure 2:
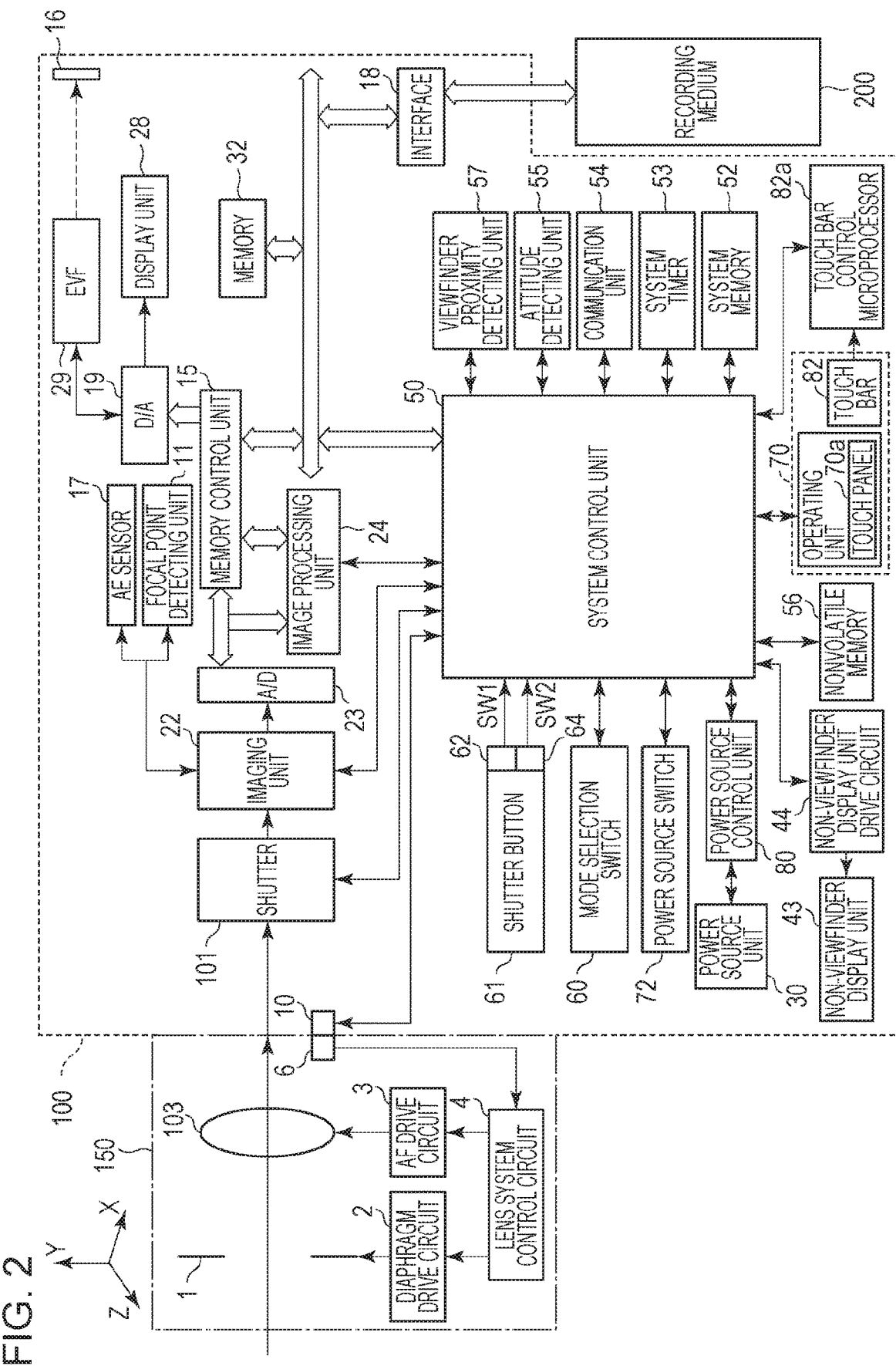
FIG. 2 is a schematic block diagram illustrating a hardware configuration example of the digital camera.

FIG. 2 is a block diagram illustrating a configuration example of the digital camera 100 according to the present embodiment. A lens unit 150 in FIG. 2 is a lens unit where exchangeable shooting lenses are mounted. A lens 103 is usually made up of multiple lenses, but is illustrated as a single lens here for the sake of simplicity.

A communication terminal 6 is a communication terminal for the lens unit 150 to communicate with the digital camera 100 side. The communication terminal 10 is a communication terminal for the digital camera 100 to communicate with the lens unit 150 side. The lens unit 150 communicates with a system control unit 50 via these communication terminals 6 and 10.

The lens unit 150 performs control of a diaphragm 1 by a lens system control circuit 4 provided inside via a diaphragm drive circuit 2, and the position of the lens 103 is changed via an automatic focus (AF) drive circuit 3, thereby performing focusing.

An AE sensor 17 performs light metering of the luminance of a subject through the lens unit 150.

A focal point detecting unit 11 outputs defocus amount information to the system control unit 50. The system control unit 50 controls the lens unit 150 based on this, thereby performing phase-difference AF.

The focal point detecting unit 11 may be a dedicated phase-difference sensor, or may be configured as an imaging plane phase-difference sensor of an imaging unit 22.

A shutter 101 is a focal plane shutter that can freely, or at least without meaningful restriction, control exposure time of the imaging unit 22 under control of the system control unit 50.

The imaging unit 22 is an imaging device configured of a charge-coupled device (CCD) or complementary metal-oxide semiconductor (CMOS) device or the like, that converts optical images into electrical signals.

An A/D converter 23 converts analog signals into digital signals. The A/D converter 23 is used for converting analog signals output from the imaging unit 22 into digital signals.

An image processing unit 24 subjects data from the A/D converter 23 or data from a memory control unit 15 to predetermined pixel interpolation, resizing processing such as reduction, and color conversion processing. The image processing unit 24 also performs predetermined computation processing using the taken image data. The system control unit 50 performs exposure control and ranging control based on the computation results obtained by the image processing unit 24. Accordingly, through-the-lens (TTL) AF processing, AE processing, and electronic flash (EF) pre-flashing is performed. The image processing unit 24 further performs predetermined computation processing using the taken image data, and performs TTL automatic white balance (AWB) processing based on the obtained computation results.

Output data from the A/D converter 23 is written to memory 32 via the image processing unit 24 and memory control unit 15, or directly written to the memory 32 via the memory control unit 15. The memory 32 stores image data obtained by the imaging unit 22 and converted into digital data by the A/D converter 23, and image data for display on the display unit 28 and EVF 29. The memory 32 has a sufficient storage capacity for storing a predetermined number of still images or a predetermined amount of time of moving images and audio. The memory 32 also serves as memory (video memory) for image display.

A D/A converter 19 converts data for image display that is stored in the memory 32 into analog signals, and supplies the resultant analog signals to the display unit 28 and EVF 29. Thus, the image data for display that has been written to the memory 32 is displayed at the display unit 28 and EVF 29 via the D/A converter 19. The display unit 28 and EVF 29 perform displays in accordance with analog signals from the D/A converter 19, on display devices such as a liquid crystal display (LCD), organic electroluminescent display (ELD), or the like.

Digital signals that have been once subjected to A/D conversion by the A/D converter 23 and stored in the memory 32 are subjected to analog conversion by the D/A converter 19, and thereafter sequentially transmitted to the display unit 28 or EVF 29 for display. Thus, LV display is performed. Hereinafter, images displayed in live view will be referred to as LV images.

Various setting values of the camera, such as shutter speed, aperture, and so forth, are displayed on the non-viewfinder display unit 43 via a non-viewfinder display unit drive circuit 44.

Nonvolatile memory 56 is electrically erasable and recordable memory. Electrically erasable programmable read-only memory (EEPROM) or the like, for example, is used. Constants, programs, and so forth for the system control unit 50 to operate, are stored in the nonvolatile memory 56.

The system control unit 50 is a control unit made up of at least one processor or circuit, and controls the entire digital camera 100. The processes of the present embodiment, which will be described later, are realized by executing the programs recorded in the aforementioned nonvolatile memory 56.

Random access memory (RAM), for example, is used for system memory 52, and constants, variables, programs read out from the nonvolatile memory 56, and so forth, for the system control unit 50 to operate, are unfolded.

The system control unit 50 also performs display control by controlling the memory 32, D/A converter 19, display unit 28, and so forth.

A system timer 53 is a clocking unit that measures time used for various types of control, and time of a built-in clock.

The mode selection switch 60, a first shutter switch 62, a second shutter switch 64, and the operating unit 70 are operating units for input of various operation instructions to the system control unit 50.

The mode selection switch 60 switches the operation mode of the system control unit 50 to one of still image shooting mode, moving image shooting mode, playback mode, or the like.

Modes included in the still image shooting mode include automatic shooting mode, automatic scene determination mode, manual mode, aperture prioritized mode (Av mode), shutter speed prioritized mode (TV mode), and programmable AE mode (P mode).

There are also various types of scene modes, custom modes, and so forth, that are shooting settings for different shooting scenes. The user can directly switch to one of these modes using the mode selection switch 60. Alternatively, an arrangement may be made where the mode selection switch 60 is used to temporarily switch to a list screen of shooting modes, and thereafter one of multiple modes displayed is selected, and other operating members are used to switch the mode. In the same way, the moving image shooting mode may include multiple modes.

The first shutter switch 62 goes on partway through operation of the shutter button 61 provided to the digital camera 100, at the so-called half-pressed state (shooting preparation instruction), and generates a first shutter switch signal SW1. The first shutter switch signal SW1 starts shooting preparation operations such as AF processing, AE processing, AWB processing, EF pre-flashing processing, and so forth.

The second shutter switch 64 goes on with operation of the shutter button 61 being completed, at the so-called full-pressed state (shooting instruction), and generates a second shutter switch signal SW2. Upon the second shutter switch signal SW2 being generated, the system control unit 50 starts the series of shooting processing operations, from reading signals from the imaging unit 22 up to writing the image that has been taken to the recording medium 200 as an image file.

The operating unit 70 is various types of operating members serving as input units for accepting operations from the user. The operating unit 70 includes at least the following operating units. Illustrated examples of the operating units are the shutter button 61, main electronic dial 71, power source switch 72, sub-electronic dial 73, directional pad 74, and set button 75. Other examples are the moving image button 76, AF lock button 77, zoom button 78, playback button 79, menu button 81, and touch bar 82.

When a user operates the touch bar 82 attached to the digital camera 100, signals output from the touch bar 82 are input to a touch bar control microcontroller 82a. The touch bar control microcontroller 82a detects various types of operations. Detected signals are input to the system control unit 50, and changing of shooting parameters of the digital camera 100 and so forth is performed.

A power source control unit 80 is made up of a battery detecting circuit, a DC-DC converter, switching circuits for switching blocks to supply voltage to, and so forth, and performs detection of whether or not a battery is mounted, the type of the battery, and remaining charge in the battery. The power source control unit 80 also controls the DC-DC converter based on the detection results thereof and instructions from the system control unit 50, to supply necessary voltage to various parts including the recording medium 200 for necessary amount of time.

A power source unit 30 is made up of a primary battery such as an alkaline battery, lithium battery, or the like, a secondary battery such as a nickel-cadmium battery, nickel-metal hydride battery, lithium-ion battery, or the like, an AC adapter, and so forth.

A recording medium interface 18 is an interface for the recording medium 200 such as a memory card, hard disk, or the like. The recording medium 200 is a recording medium such as a memory card or the like, for recording images that have been shot, and is made up of semiconductor memory, a magnetic disk, or the like.

A communication unit 54 is externally connected wirelessly or by cable, and exchanges video signals and audio signals. The communication unit 54 is also configured to connect with a wireless local area network (LAN), the Internet, or the like. The communication unit 54 is further configured to communicate with external equipment via a wireless technology standard such as Bluetooth (a registered trademark) or a wireless personal area network technology such as Bluetooth Low Energy as well. The communication unit 54 is configured to transmit images (including LV images) taken by the imaging unit 22, and images recorded in the recording medium 200, and further can receive images and other various types of information from external equipment.

An attitude detecting unit 55 detects the attitude of the digital camera 100 as to the gravitational direction. Whether an image taken by the imaging unit 22 is an image taken with the digital camera 100 held landscape or an image taken with the digital camera 100 portrait, can be distinguished based on the attitude detected by the attitude detecting unit 55. The system control unit 50 is configured to add orientation information according to the attitude detected by the attitude detecting unit 55 to image files of images taken by the imaging unit 22, and rotate and record images. Examples of the attitude detecting unit 55 include acceleration sensors, gyro sensors, and so forth. Movement of the digital camera 100 (panning, tilting, raising, whether still or not, etc.) can also be detected using the acceleration sensors, gyro sensors, and so forth, serving as the attitude detecting unit 55.

The viewfinder proximity detecting unit 57 is a viewfinder proximity detecting sensor that detects (proximity detection) approaching (proximal) of an eye (object) to the eyepiece 16 of the viewfinder and retraction (distanced) thereof. The system control unit 50 switches the display (display state)/non-display (non-display state) of the display unit 28 and EVF 29 in accordance with the state detected by the viewfinder proximity detecting unit 57. More specifically, in at least a shooting standby state where switching of the display location is being automatically switched, the display unit 28 is set as the display location and display is turned on, and the EVF 29 is turned off while the eye is not in proximity with the eyepiece 16. On the other hand, display at the display unit 28 is turned off and the EVF 29 is set as the display location and display is turned on while the eye is in proximity with the eyepiece 16.

An infrared proximity sensor, for example, can be used for the viewfinder proximity detecting unit 57, to detect some sort of object approaching the eyepiece 16 of the viewfinder in which the EVF 29 is built in. In a case where an object is approaching, infrared rays cast by an emitting unit (omitted from illustration) of the viewfinder proximity detecting unit 57 are reflected and received at a photoreceptor (omitted from illustration) of the infrared proximity sensor. How far the object is from the eyepiece 16 (viewfinder proximity distance) can also be distinguished by the amount of infrared rays received. Thus, the viewfinder proximity detecting unit 57 performs proximity detection to detect the proximity distance of an object to the eyepiece 16.

In a case where an object is detected approaching the eyepiece 16 within a predetermined distance therefrom, from a viewfinder distanced state (a distanced state), proximity of an eye is detected. In a case where an object that had been in proximity has moved away a predetermined distance, from a viewfinder proximity state (a proximity state), distancing of the eye is detected. The threshold value at which proximity of an eye is detected, and the threshold value at which distancing of an eye is detected, may be different, with a hysteresis provided, for example. Once proximity of an eye is detected, the state is a viewfinder proximity state until distancing of the eye is detected. Once distancing of the eye is detected, the state is a viewfinder distanced state until proximity of the eye is detected. Note that an infrared proximity sensor is but one example, and other sensors may be employed for the viewfinder proximity detecting unit 57 as long as proximity of an eye or an object, that can be deemed to be proximity of an eye, can be detected.

The touch panel 70a can be integrally configured with the display unit 28. For example, the touch panel 70a is configured having a light transmittance so as not to impede display of the display unit 28, and is attached to the top layer of the display face of the display unit 28. The input coordinates on the touch panel 70a are correlated with the display coordinates on the display face of the display unit 28. Accordingly, a graphical user interface (GUI), which gives the impression of the user being able to directly operate the screen displayed on the display unit 28, can be provided.

The system control unit 50 calculates positional coordinates of a thumb touching the touch bar 82, based on output information from the touch bar 82. The system control unit 50 can further detect the following operations and states regarding the touch bar 82. A thumb that has not been in touch with the touch bar 82 has newly touched the touch bar 82, i.e., a touch has been started (hereinafter referred to as touch-down).

A thumb is in a state touching the touch bar 82 (hereinafter referred to as touch-on).

A thumb is moving while being in a state touching the touch bar 82 (hereinafter referred to as touch-move).

A thumb that had been in a state touching the touch bar 82 has moved away (hereinafter referred to as touch-up).

A state where nothing is touching the touch bar 82 (hereinafter referred to as touch-off).

When touch-down is detected, touch-on is also detected at the same time. Unless touch-up is detected after touch-down, touch-on normally continues to be detected. Touch-move is detected in a state where touch-on is detected. Even if touch-on is detected, touch-move is not detected unless the touch position moves. Touch-off is established after touch-up of the thumb in touch has been detected.

These operations and states, and positional coordinates of a finger or pen touching the touch bar 82, are notified to the system control unit 50 via an internal bus. The system control unit 50 determines what sort of operations (touch operations) have been made on the touch bar 82, based on the information notified thereto.

The movement over the touch bar 82 in the horizontal direction is detected during a touch-move. In a case where a touch-move of a predetermined distance or longer has been detected, a slide operation is determined to have been performed. In a case where the touch bar 82 is touched by a thumb, and the touch is released within a predetermined amount of time without performing a slide operation, a tap operation is determined to have been performed.

The touch bar 82 according to the present embodiment is a capacitive touch sensor. However, the touch bar 82 may be a different type of touch sensor, such as resistive film, surface acoustic wave, infrared, electromagnetic induction, image recognition, optical sensor, and so forth.

First Example

An example of the present disclosure will be described with reference to FIGS. 3A through 4.
Rear View of Digital Camera 100

Figure 3A:
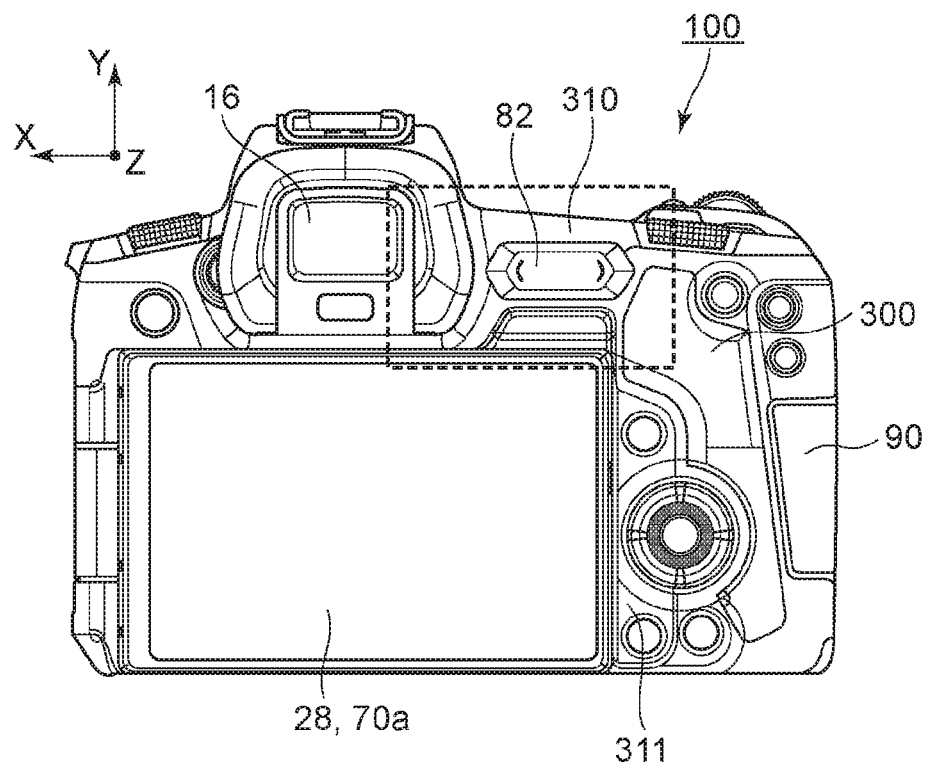
FIGS. 3A and 3B are rear views of a digital camera according to a first example.
Figure 3B:
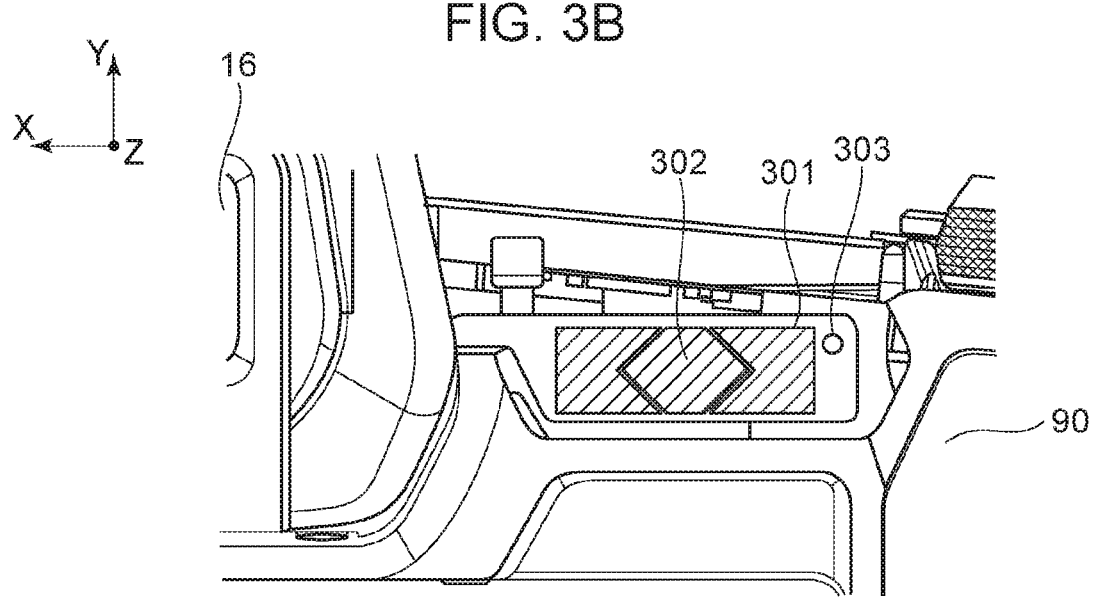

FIGS. 3A and 3B are rear views of the digital camera 100. FIG. 3A is an external view of the digital camera 100 from the rear direction. The touch bar 82 is disposed between an upper cover 310 and a rear cover 311 that give the digital camera 100 its external appearance. FIG. 3B is an enlarged view of the area defined by dotted lines in FIG. 3A, with the touch bar 82 and upper cover 310 being omitted from illustration.

The thumb standby position 300 generally exists above a position where the grip portion 90 is projected on the rear side as illustrated in FIG. 3A, and often the position is indicated by application of rubber or the like, which also increases grip.

The touch detecting face of the touch sensor electrode 302 is divided into a first touch sensor electrode 302a, a second touch sensor electrode 302b, and a third touch sensor electrode 302c, in order, in the direction of slide operations. The relation of $$1.4 \leq W1/W2 \leq 6.0$$

where W1 represents the length of the touch detecting face of the touch sensor electrode 302 in the direction of slide operations, and W2 represents the length of the second touch sensor electrode 302b in the direction of slide operations, is satisfied.

FIG. 3B illustrates a flexible printed board 301 (hereinafter "flexible board 301") disposed on the rear of the touch bar 82. The flexible board 301 is applied to the touch bar 82 and fixed by double-sided adhesive tape or the like, that is omitted from illustration. Providing a boss that is omitted from illustration to the touch bar 82, and providing a positioning hole 303 to the flexible board 301, enables the flexible board 301 to be applied to the touch bar 82 with higher precision.

The touch sensor electrode 302 that performs detection by capacitance is formed of a conductor such as copper foil or the like on the flexible board 301. Accordingly, the touch sensor electrode 302 on the flexible board 301 fixed to the touch bar 82 detects change in capacitance by the user touching the touch bar 82 with the thumb or the like, thereby enabling various types of operations to be performed. Note that this is not restricted to the capacitance touch detection method, and other methods may be used, such as resistive film, surface acoustic wave, infrared, and so forth.

Figure 4:
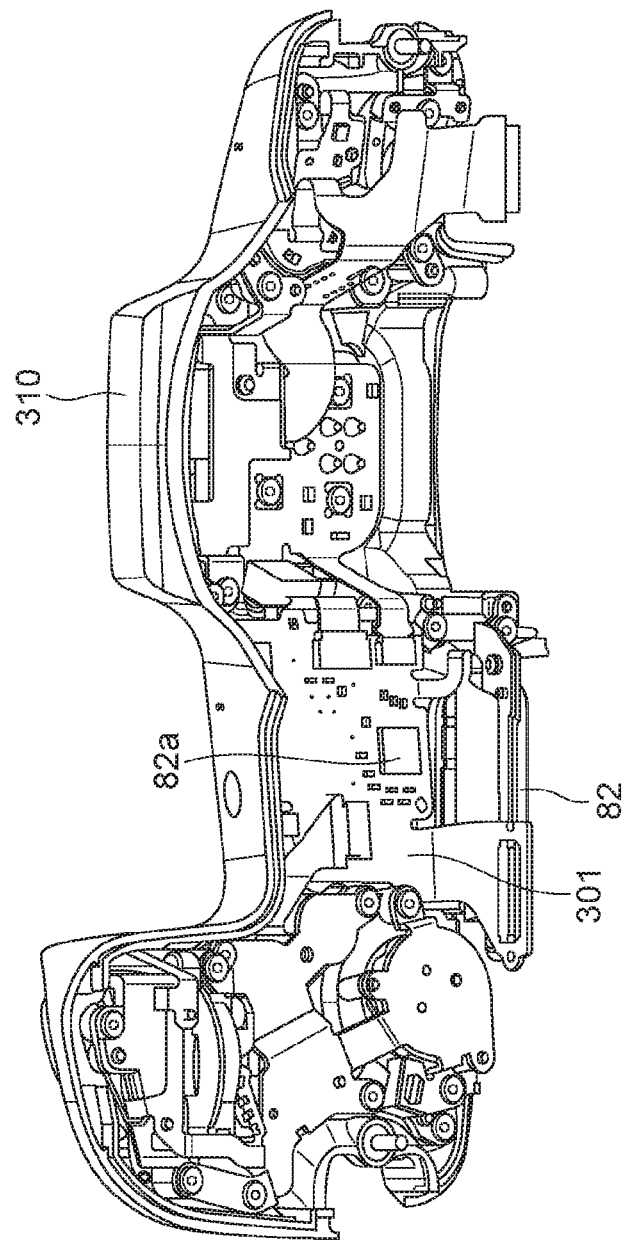
FIG. 4 is a diagram viewing an upper cover having a touch bar according to the first example.

FIG. 4 is a diagram viewing from the inner side of the upper cover 310 that has the touch bar 82. FIG. 4 is a view of the flexible board 301 from the inner side, with regard to FIGS. 3a and 3B. Accordingly, the touch sensor electrode 302 is disposed to the touch bar 82 side (far side) of the flexible board 301. Touch detection signals output from the touch sensor electrode 302 are input to the touch bar control microcontroller 82a, for detection of tap operations, slide operations, and so forth.

Operations Using Touch Bar 82

Figure 5A:
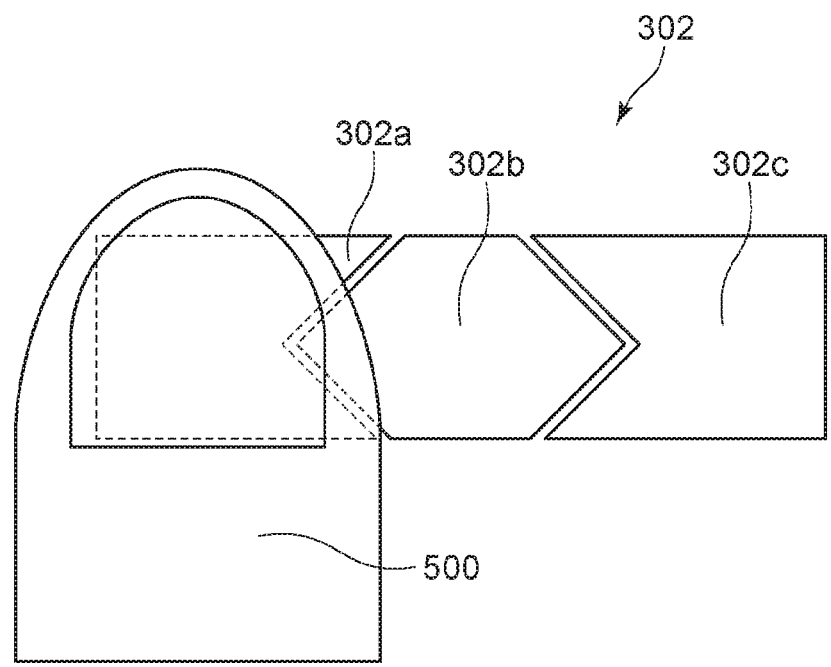
FIGS. 5A and 5B are conceptual diagrams of tap operations according to the first example.
Figure 5B:
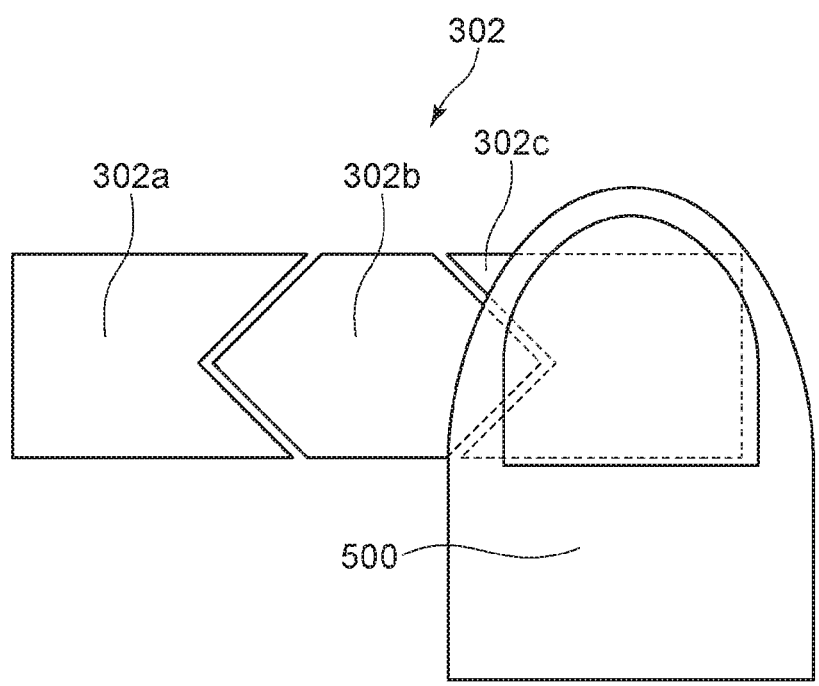
Figure 6A:
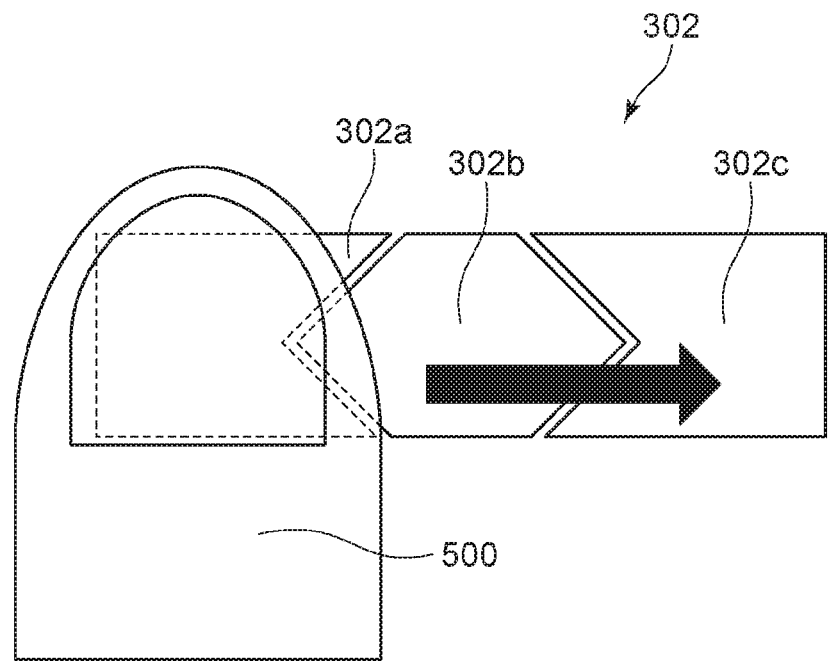
FIGS. 6A and 6B are conceptual diagrams of slide operations according to the first example.
Figure 6B:
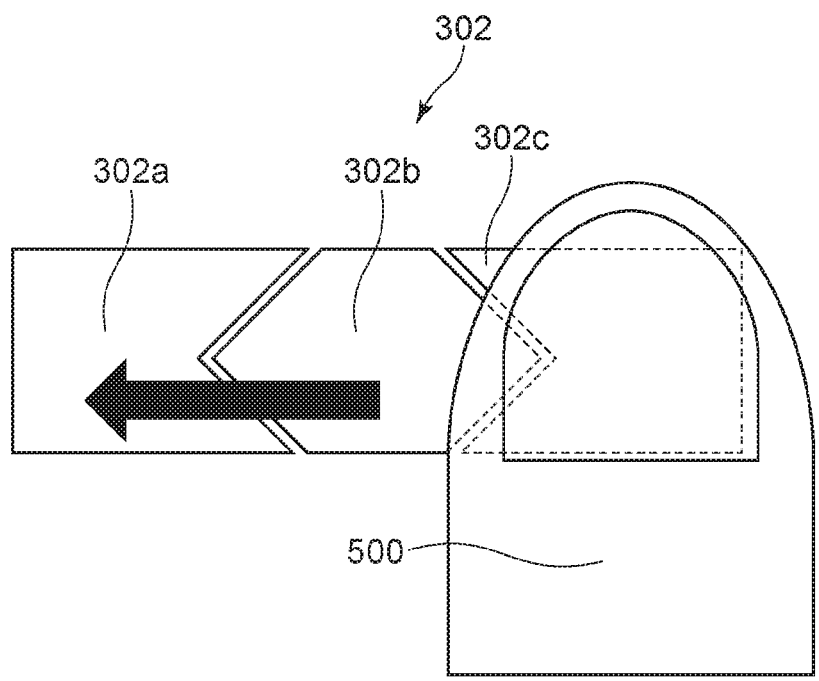

Operations using the touch bar 82 will be described below in detail with reference to FIGS. 5A through 7. FIGS. 5A and 5B are conceptual diagrams of tap operations, FIGS. 6A and 6B are conceptual diagrams of slide operations, and FIG. 7 is a conceptual diagram of full-area pressing operations. The outlines of the touch bar 82 and flexible board 301 are omitted throughout FIGS. 5A through 7. Only a touch sensor electrode 302, and an operating thumb 500 by which the user performs operations, are illustrated.

The touch sensor electrode 302 is made up of three electrodes which are a first touch sensor electrode 302a, a second touch sensor electrode 302b, and a third touch sensor electrode 302c, in order from the side closer to the eyepiece 16. The touch sensor electrode 302 detects change in capacitance by the operating thumb 500 by which the user performs operations, whereby tap operations, slide operations, and full-area pressing operations can be performed.

In reality, touch detection is performed by the operating thumb 500 of the user coming into contact with the touch bar 82 disposed at the near side of the touch sensor electrode 302. However, description will be made below that touch detection is performed by the operating thumb 500 coming into contact with the touch sensor electrode 302, in order to simplify description regarding tap operations, slide operations, and full-area pressing operations.

Tap Operations

FIGS. 5A and 5B are conceptual diagrams of tap operations, where FIG. 5A is a conceptual diagram of a left tap operation, and FIG. 5B is a conceptual diagram of a right tap operation. The operating thumb 500 of the user comes into contact with the first touch sensor electrode 302a, and then moves away, as illustrated in FIG. 5A, which is detected as a left tap operation. In the same way, the operating thumb 500 of the user comes into contact with the third touch sensor electrode 302c, and then moves away, as illustrated in FIG. 5B, which is detected as a right tap operation.

Although two tap operations of left tap operation and right tap operation have been described, this is not restrictive. A middle tap operation may be provided using the second touch sensor electrode 302b.

Slide Operations

FIGS. 6A and 6B are conceptual diagrams of slide operations, where FIG. 6A is a conceptual diagram of a right slide operation, and FIG. 6B is a conceptual diagram of a left slide operation. The operating thumb 500 comes into contact with the first touch sensor electrode 302a of the touch sensor electrode 302, and then moves toward the direction of the third touch sensor electrode 302c, as illustrated in FIG. 6A, which is detected as a right slide operation. In the same way, the operating thumb 500 comes into contact with the third touch sensor electrode 302c, and then moves toward the direction of the first touch sensor electrode 302a, as illustrated in FIG. 6B, which is detected as a left slide operation.

The start position of slide operations is not restricted to the first touch sensor electrode 302a or third touch sensor electrode 302c, and a slide operation may start from contact with the second touch sensor electrode 302b. That is to say, movement where the operating thumb 500 comes into contact with the second touch sensor electrode 302b, and then moves toward the direction of the third touch sensor electrode 302c, may be detected as a right slide operation. Similarly, movement where the operating thumb 500 of the user comes into contact with the second touch sensor electrode 302b, and then moves toward the direction of the first touch sensor electrode 302a, may be detected as a left slide operation.

Full-Area Pressing Operations

FIG. 7 is a conceptual diagram of a full-area pressing operation. All of the first touch sensor electrode 302a, second touch sensor electrode 302b, and third touch sensor electrode 302c of the touch sensor electrode 302 pressed by the operating thumb 500 at once, which is detected as a full-area pressing operation, as illustrated in FIG. 7. While the operating thumb 500 is pressed generally perpendicularly as to the touch sensor electrode 302 the in tap operations and slide operations, the operating thumb 500 is pressed generally parallel as to the touch sensor electrode 302 in full-area pressing operations. That is to say, this is an operation that is relatively difficult to perform in comparison with tap operations and slide operations, but on the other hand, this is an operation that the user cannot perform without intent to do so.

The user does not necessarily have to touch all of the touch sensor electrode 302 as illustrated in FIG. 7 to perform full-area pressing operations. A full-area pressing operation may be recognized even if part of the first touch sensor electrode 302a and part of the third touch sensor electrode 302c is not being touched.

Specific Size of Touch Sensor Electrode 302

Figure 8:
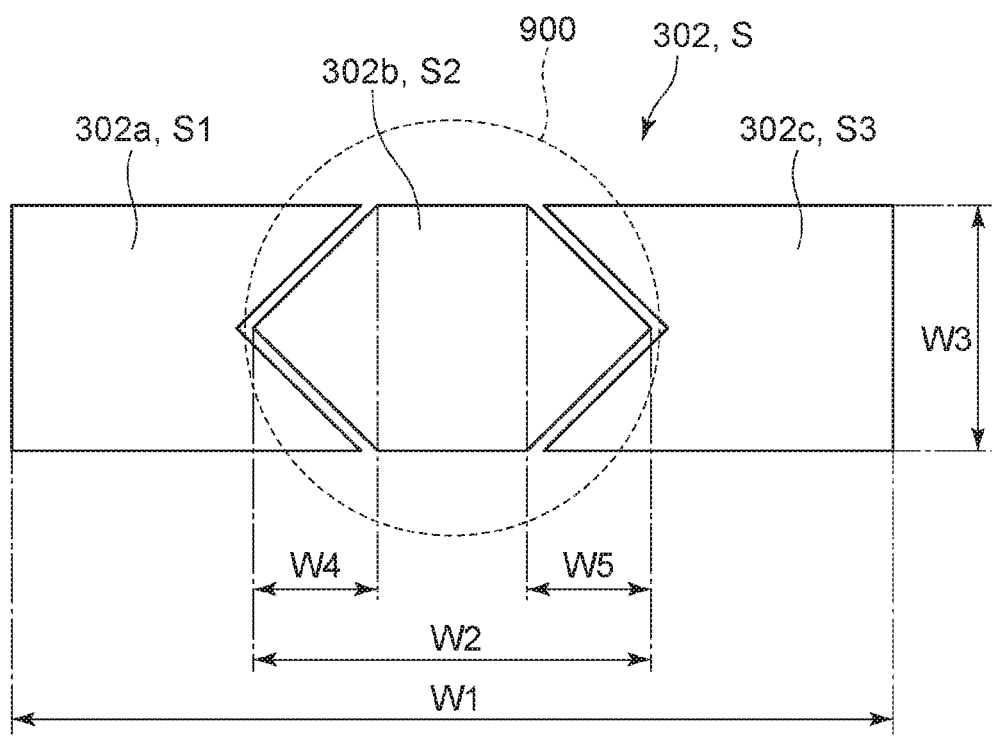
FIG. 8 is a conceptual diagram of an electrode size configured to prevent unintentional full-area pressing, according to the first example.

The specific size of the touch sensor electrode 302 will be described with reference to FIGS. 8 and 9. FIG. 8 is a conceptual diagram of an electrode size to prevent unintentional full-area pressing operations. W1 represents the length of the long sides of the touch sensor electrode 302. W2 represents the length of the long sides of the second touch sensor electrode 302b that is the middle electrode, and W3 represents the length of the short sides of the touch sensor electrode 302. W4 represents the overlapping length of the portion where the second touch sensor electrode 302b overlaps the first touch sensor electrode 302a, and W5 represents the overlapping length of the portion where the second touch sensor electrode 302b overlaps the third touch sensor electrode 302c.

Description of tap operations, slide operations, and full-area pressing operations using the operating thumb 500 and touch sensor electrode 302 have been made regarding FIGS. 5A through 7. In FIG. 8, the area of the operating thumb 500 that actually comes into contact with the touch sensor electrode 302 will be described as a contact area 900 when performing tap operations. Note that an operation of the operating thumb 500 lightly coming into contact with the touch bar 82 is assumed for a tap operation, and the contact area at that time will be a generally circular shape.

A "size where only a desired or predetermined part of the electrode is touched when performing a tap operation" is crucial or at least significant in the ideal electrode size for measures to prevent erroneous operations when performing full-area pressing operations. That is to say, it is important for the contact area 900 not to come into contact with the adjacent first touch sensor electrode 302a and third touch sensor electrode 302c as much as possible when tapping on the second touch sensor electrode 302b. Thus, the relation between the contact area 900 and the long side length W2 of the second touch sensor electrode 302b at the time of tap operations is important.

The present example assumes that the digital camera 100 will be operated while in a state of being held in the hands, and accordingly the operating thumb 500 is assumed as performing operations, rather than a finger. Tap operations are performed by the operating thumb 500, so the width of the thumb and the long side length W2 are in a close relation. The average width of the thumb of a Japanese is approximately 20 mm, so 5 mm, which is ¼ thereof, is assumed to be the contact area 900 when performing a tap operation, and the long side length W2 of the long sides of the second touch sensor electrode 302b is assumed to be 5 mm or longer. Still, a great deal of users will not be of average size, and there will be users with considerably larger thumbs. However, it is sufficient for the long side length W2 of the long sides of the second touch sensor electrode 302b to be 5 mm or longer, even for such individuals.

Also, while the operating thumb 500 has been assumed for performing operations, an arrangement may be made where the touch bar 82 is disposed on the upper face of the upper cover 310 and is operated by the index finger. Even in this case, operations can be performed without issue if the long side length W2 is 5 mm or longer. A range of 5 mm≤W2≤20 mm is preferable as an ideal length of the long side length W2 of the touch sensor electrode 302.

Figure 9:
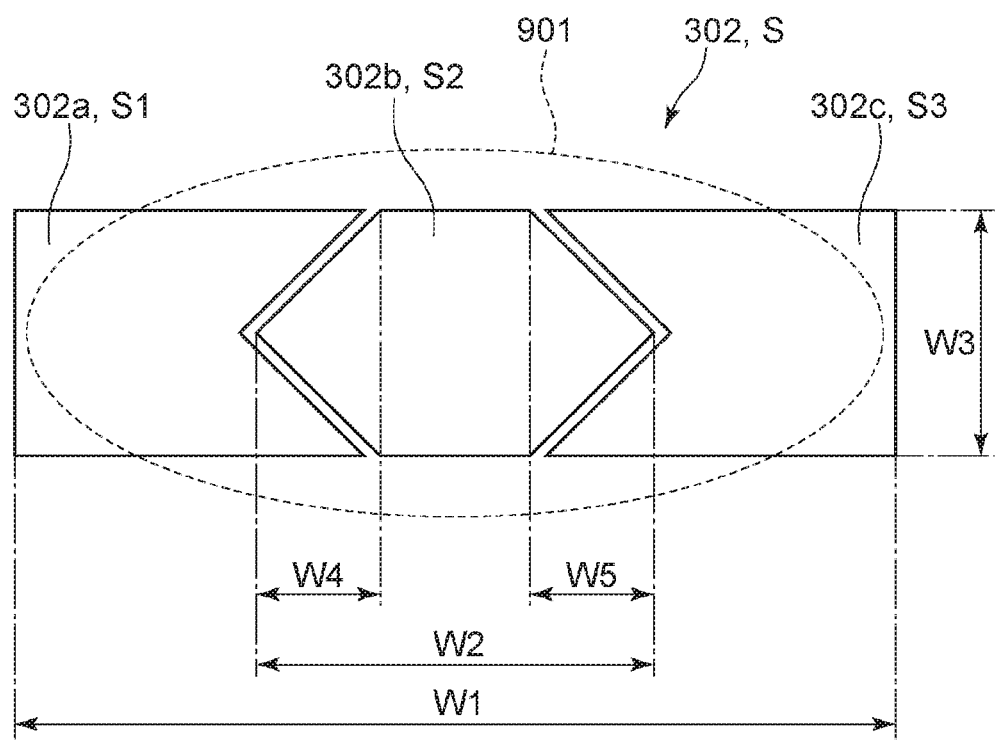
FIG. 9 is a conceptual diagram of an electrode size configured to execute full-area pressing operations, according to the first example.

FIG. 9 is a conceptual diagram of electrode size enabling full-area pressing operations. In the same way as above, W1 represents the length of the long sides of the touch sensor electrode 302, W2 represents the length of the long sides of the second touch sensor electrode 302b that is the middle electrode, and W3 represents the length of the short sides of the touch sensor electrode 302. W4 represents the overlapping length of the portion where the second touch sensor electrode 302b overlaps the first touch sensor electrode 302a, and W5 represents the overlapping length of the portion where the second touch sensor electrode 302b overlaps the third touch sensor electrode 302c.

In FIG. 9, the area of the operating thumb 500 that actually comes into contact with the touch sensor electrode 302 when performing full-area pressing operations will be described as a contact area 901 when performing full-area pressing operations. Note that an operation of the entire operating thumb 500 coming into contact with the touch bar 82 is assumed for a full-area pressing operation, and the contact area at that time will be a generally elliptic shape. A "size where the entire electrode can be easily touched by the user when performing a full-area pressing operation" is important in the ideal electrode size for full-area pressing operations with good operability. That is to say, it is necessary for the contact area 901 cover the touch sensor electrode 302 during full-area pressing operations by the user.

The contact area 901 when performing full-area pressing operations and the long side length W1 of the touch sensor electrode 302 are important. The present example assumes that the digital camera 100 will be operated while in a state of being held in the hands, and accordingly will be operated by the operating thumb 500.

There is a need for the contact area 901 for full-area pressing operations to cover the touch sensor electrode 302 when performing full-area pressing operations. This is a length where up to the first joint of the operating thumb 500 to be able to press in a stable state to cover a broad area in a sure manner using the operating thumb 500. That is to say, up to the first joint is a length that the touch sensor electrode 302 can be pressed in a stable manner in the present example.

The average length of the thumb of Japanese is 60 mm, so assuming the length of the thumb to the first joint as being 30 mm that is half thereof, the long side length W1 of the touch sensor electrode 302 will be assumed to be 30 mm or less. Still, a great deal of users will not be of average size, and there will be users with considerably larger thumbs. However, it is sufficient for the long side length W1 of the long sides of the touch sensor electrode 302 to be 30 mm or less, even for such individuals. Also, while the operating thumb 500 has been assumed for performing operations, an arrangement may be made where the touch bar 82 is disposed on the upper face of the upper cover 310 and is operated by the index finger. Even in this case, operations can be performed without issue if W1 is 30 mm or less. A range of 7 mm≤W1≤30 mm is preferable as an ideal length of the long side length W1 of the touch sensor electrode 302.

From the above description, it is sufficient for the size of the touch sensor electrode 302 to satisfy a relation of $$1.4 \leq W1/W2 \leq 6$$

for the long side length W1 of the touch sensor electrode 302 and long side length W2 of the second touch sensor electrode 302b.

In the present example, a first function is executed in a case where a touch operation and slide operation is making contact with the touch sensor electrode 302 by a finger/thumb over an area that is a first predetermined area and a second predetermined area or less, the second predetermined area being larger than the first predetermined area. In a case where the touch operation is a finger/thumb in contact with the touch sensor electrode 302 over an area that is larger than the first predetermined area (full-area pressing operation), a second function that is different from the first function is executed.

Next, description will be made regarding the short side length W3 and overlap lengths W4 and W5 of the touch sensor electrode 302. Note that W4 and W5 may be the same values or may be different values. Description will be made below with W4=W5.

Generally, the greater the short side length W3 of the touch sensor electrode 302 is, the greater the area of the touch sensor electrode 302 will be, which is advantageous or beneficial for detection. However, increasing the short side length W3 of the touch sensor electrode 302 leads to a larger digital camera 100, so it is preferable that the short side length W3 of the touch sensor electrode 302 be small to a certain level.

The touch sensor electrode 302 is an electrode that performs one-dimensional detection. Accordingly, a relationship where W2≥W3 is preferable as the relation between the long side length W2 of the second touch sensor electrode 302b in the detection direction (direction of slide operations) and the short side length W3 of the touch sensor electrode 302. More specifically, a range of $$2 \text{ mm} \leq W3 \leq 20 \text{ mm}$$

is preferable. According to this relation, the short side length W3 of the touch sensor electrode 302 can be minimalized without losing operability of sliding and so forth.

Next, a relation where $$1.8 \leq W3/W4 \leq 2.2$$

is preferable for the relation of the overlapping length W4 and the short side length W3 of the touch sensor electrode 302. That is to say, the angle of the overlapping portion preferably is approximately 90°. That is to say, the second touch sensor electrode 302b and first touch sensor electrode 302a overlap in the direction of slide operations.

A relation of $$1.8 \leq W3/W4 \leq 2.2$$

where W4 represents the overlap amount in the direction of slide operations of the second touch sensor electrode 302b and first touch sensor electrode 302a, and the length of the second touch sensor electrode 302b in the direction orthogonal to the direction of slide operations of the second touch sensor electrode 302b, is preferably satisfied.

The following is a description of a case where W4 and W5 are different values. The second touch sensor electrode 302b and third touch sensor electrode 302c overlap in the direction of slide operations. A relation of $$1.8 \leq W3/W5 \leq 2.2$$

where W5 represents the overlap amount in the direction of slide operations of the second touch sensor electrode 302b and third touch sensor electrode 302c, and W3 represents the length of the second touch sensor electrode 302b in the direction orthogonal to the direction of slide operations of the second touch sensor electrode 302b, is satisfied.

A relation of $$1.4 \leq W1/W2 \leq 6.0$$

where W1 represents the length of the touch sensor electrode 302 in the direction of slide operations, and W2 represents the length of the second touch sensor electrode 302b in the direction of slide operations is satisfied in the present example. Further, a relation of $$2 \leq W1/W2 \leq 3$$

is more preferable.

That is to say, a size where the long side length W2 of the second touch sensor electrode 302b is from ⅓ to ½ of the long side length W1 of the touch sensor electrode 302 is preferable. Specifically, the long side length W1 of the touch sensor electrode 302 was set to 20 mm, and the long side length W2 of the second touch sensor electrode 302b to 9 mm. The touch sensor electrode 302 was configured with the short side length W3 of the touch sensor electrode 302 being 5.6 mm, and the overlapping length W4 being 2.8 mm.

Next, description will be made regarding the relation of surface areas of electrodes where S represents the surface area of the touch sensor electrode 302, S1 represents the surface area of the first touch sensor electrode 302a, S2 represents the surface area of the second touch sensor electrode 302b, and S3 represents the surface area of the third touch sensor electrode 302c. The surface area S of the touch sensor electrode 302 preferably is in a range of $$14 \text{ mm}^2 \leq S2\ 600 \text{ mm}^2$$

and the surface area S2 of the second touch sensor electrode 302b preferably is in a range of $$10 \text{ mm}^2 \leq S2\ 400 \text{ mm}^2.$$

Although S1 and S3 are the same size in the first example, this is not restrictive, and may be different sizes.

Although description has been made above where electrodes are stipulated with reference to the size of a finger/thumb performing operations, the long side length W2 of the second touch sensor electrode 302b may be decided with reference to a different method. For example, in a case where the display unit 28 is provided with a touch panel 70a, a rectangular touchable touch icon is displayed on the display unit 28. The long side length W2 of the second touch sensor electrode 302b may be longer than the smallest width of the short sides of the touch icon.

Determination of tap operations and full-area pressing operations can be made to be more effective by also adjusting the threshold value of detected capacitance, and not just the size of the touch sensor electrode 302. The determination threshold value of the full-area pressing operation that is the second function is higher than the determination threshold value of the tap operation that is the first function.

Second Example

A second example of the present disclosure will be described below with reference to FIGS. 10A and 10B. Configurations in FIGS. 1 and 2 are the same as in the first embodiment, so description will be omitted.

Figure 10A:
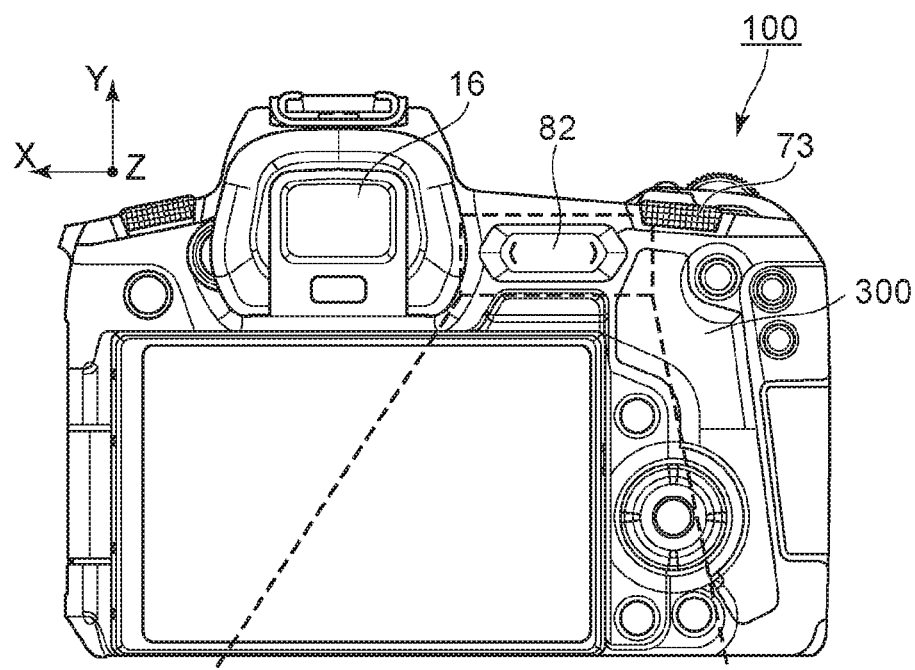
FIGS. 10A and 10B are diagrams illustrating layout position and internal configuration of a touch bar in a rear view of a digital camera according to a second example.
Figure 10B:
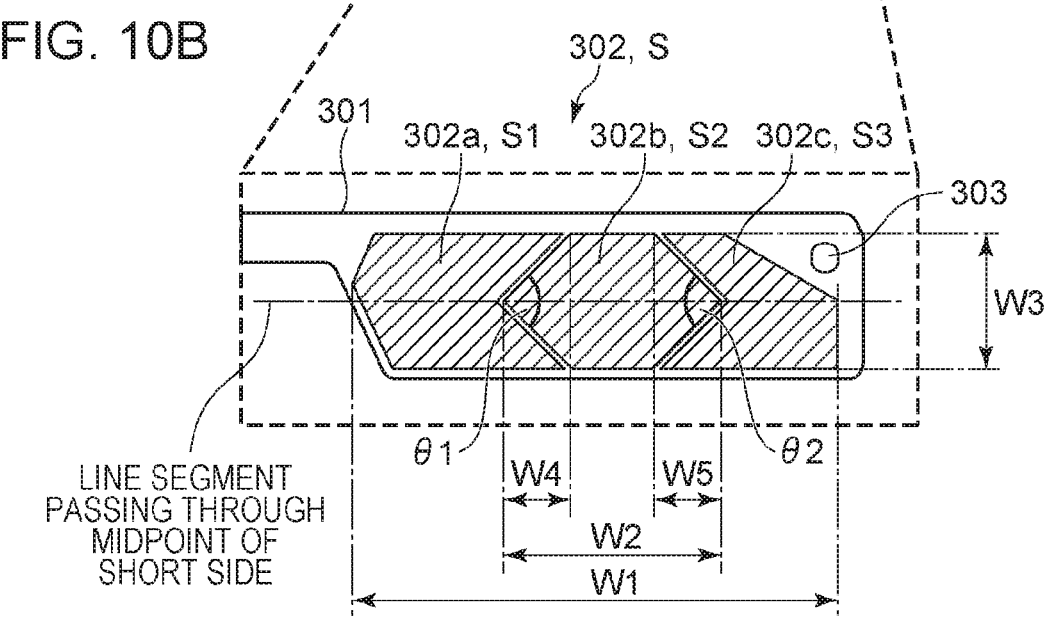

FIGS. 10A and 10B are diagrams illustrating the layout position and internal configuration of the touch bar 82 in the digital camera 100 serving as the imaging apparatus according to the present example. The touch bar 82 is disposed on the rear side of the digital camera 100, adjacent to the eyepiece 16, as illustrated in FIG. 10A. The touch bar 82 is also disposed adjacent to the sub-electronic dial 73, and to a standby position 300 for the thumb, which is the position of the thumb in a case of gripping the grip portion 90 with the right hand to hold the camera.

The thumb standby position 300 generally exists at an upper position where the grip portion 90 is projected on the rear side as illustrated in FIG. 10A, and often the position is indicated by application of rubber or the like, which also increases grip. The layout is such that tap operations and slide operations to the left and right (in the X axis direction) and so forth is easily performed by the thumb of the right hand in a state of gripping the grip portion 90, as described above, due to the touch bar 82 being adjacent to the thumb standby position 300.

The touch bar 82 can assign functions in accordance with operations. For example, settable exposure-related setting values can be assigned using the main electronic dial 71 and sub-electronic dial 73 that are operating members. Exposure-related setting values are shutter speed (Tv), aperture value (Av), ISO sensitivity, an exposure correction values when in automatic exposure mode.

The touch bar 82 can also assign, besides exposure-related setting values, settings such as white balance settings, AF mode, drive mode, and playback feed.

When in the moving image mode, microphone recoding level adjustment, or moving image playback fast-forward or reverse functions can be assigned.

For example, a case of having assigned functions of ISO sensitivity settings to the touch bar 82 will be described. For example, in a case of a tap operation being performed at a position to the left half, functions of setting the shooting ISO sensitivity of the digital camera 100 to sensitivity ⅓ step lower are assigned. In a case where a tap operation is performed at positional coordinates to the right half side, functions of setting the shooting ISO sensitivity to sensitivity ⅓ step higher are assigned. In a case where slide operations are performed, functions of setting the shooting ISO sensitivity of the digital camera 100 to sensitivity ⅓ step higher or lower are assigned for each step of sliding. These assigned functions are user-customizable.

For example, changes can be made such as, in a case where a tap operation is made at a left half position, functions for automatically setting shooting ISO sensitivity of the digital camera 100 are assigned. In a case where a tap operation is made at a right half positional coordinate, functions for setting the shooting ISO sensitivity to the highest ISO sensitivity are assigned.

Now, unless determination of operations are not made accurately with regard to the intent of operations by the user, erroneous operations will occur. However, consistency of operations as to intent may suffer depending on the distance of the touch bar 82 from the thumb standby position 300 and the positional relation as to other members on the equipment. For example, ease of touching changes depending on the distance from the thumb standby position 300. Specifically, the touch bar 82 is easy to touch near the thumb standby position 300, but the closer from that position toward the eyepiece 16, the more the thumb needs to be stretched, and the more difficult touching becomes.

The eyepiece 16 is a direct viewfinder where images displayed on the internal EVF 29 are viewed, as described above. However, the eyepiece 16 has a protruding shape projecting to the outer cover side (rear side) so that a suitable eyepoint can be secured, and that the nose does not readily come into contact with the display unit 28 when in proximity. In the present example, the eyepiece 16 is protruding 15 mm or more in the Z direction as compared to the touch face of the touch bar 82. Accordingly, touch input to the edge of the touch bar 82 adjacent to the eyepiece 16 is difficult. Particularly with regard to slide operations, in a case where input cannot be performed from edge to edge, the number of steps of setting values is reduced, so the effects thereof are pronounced. Accordingly, while a protruding shape of 15 mm or more, which is relatively great, has been exemplified in the present example, effects on operability are manifested even with a protruding shape of 1 mm or more.

Also, the sub-electronic dial 73 is a rotational operating member as described above. Input of multiple stages can be performed by rotating in the horizontal direction (X-axis direction) using the thumb of the right hand. However, there is the possibility of unintentionally touching the adjacent touch bar 82 at the time of this operation.

Particularly, in a case of moving the cursor or changing values a great deal, the rotational operation will be performed repetitively, and operation tends to be performed with momentum. Accordingly, there will be a greater chance of the operating thumb 500 coming into contact with portions adjacent to the sub-electronic dial 73.

Accordingly, reduction of erroneous operations of touch input will be studied from the perspective of ease of touching, in accordance with the distance from the thumb standby position 300 and the positional relation as to other members on the equipment. Specifically, erroneous operations are reduced by changing the relative area of the touch sensor electrodes serving as the detecting unit for touch operations.

FIG. 10B is a diagram illustrating the shape of the touch operation detecting unit according to the present example. The touch sensor electrode 302 is provided as a touch operation detecting unit within the touch bar 82, as illustrated in FIG. 10B. The touch detecting face of the touch sensor electrode 302 is laid out divided into the three of 302a, 302b, and 302c, from the side of the eyepiece 16, in the present example. Although the touch detecting face of the touch sensor electrode is divided into three in the description of the present example, this is not restricted to being divided into three, and may be divided into two, four, or more.

The touch sensor electrodes are formed of copper foil or the like on the flexible board 301, and connected to the system control unit 50 by copper foil wiring (omitted from illustration) on the flexible board 301. The system control unit 50 calculates positional coordinates based on output information from the touch bar 82, i.e., information input from the first through third touch sensor electrodes 302a, 302b, and 302c, as described above. What sort of operations have been performed at the touch bar 82 is determined from operations and states.

W1 represents the length of the long sides of the touch sensor electrode 302 in FIG. 10B. W2 represents the length of the long sides of the second touch sensor electrode 302b that is the middle electrode, and W3 represents the length of the short sides of the touch sensor electrode 302. W4 represents the overlapping length of the portion where the second touch sensor electrode 302b overlaps the first touch sensor electrode 302a, and W5 represents the overlapping length of the portion where the second touch sensor electrode 302b overlaps the third touch sensor electrode 302c.

Also, a desirable relation of surface areas in the present example is $S1 \geq S2 \geq A3$ where S represents the surface area of the touch sensor electrode 302, S1 represents the surface area of the first touch sensor electrode 302a, and S3 represents the surface area of the third touch sensor electrode 302c. The surface area S of the touch sensor electrode 302 preferably is in a range of $14 \text{ mm}^2 \leq S \ 600 \text{ mm}^2$ and the surface area S2 of the second touch sensor electrode 302b preferably is in a range of $10 \text{ mm}^2 \leq S2 \ 400 \text{ mm}^2$.

Specifically, the first touch sensor electrode 302a has an area that is relatively larger than that of the touch sensor electrode 302c, as illustrated in FIG. 10B, and input is performed more readily. In the present example, the area of the first touch sensor electrode 302a is approximately 36 mm$^2$, the area of the second touch sensor electrode 302b is approximately 34 mm$^2$, and the area of the third touch sensor electrode 302c is approximately 26 mm$^2$. The touch sensor electrode 302a is set to have an area of 1.3 to 1.4 times that of the touch sensor electrode 302c, and the relation in size among the touch sensor electrodes is set to be 302a>302b>302c.

Thus, the first touch sensor electrode 302a can be adjusted to provide a desired or predetermined case of input, by cancelling out the distance from the thumb standby position 300 and difficulty of input due to being adjacent to the eyepiece 16. This adjustment enables calculation of coordinates and determination of operations to be performed accurately as to the intent of operations by the user.

The third touch sensor electrode 302c has a shape where close to the sub-electronic dial 73 has been cut off, as illustrated in FIG. 10B. More specifically, the third touch sensor electrode 302c has been cut such that a grade is formed where the cut region increases the closer to the sub-electronic dial 73 in the X-axis direction. Accordingly, unintended input occurs less readily at the third touch sensor electrode 302c even in a case where the user operates the sub-electronic dial 73 with momentum.

Further, a positioning hole 303 is provided to the flexible board 301 in free space created by narrowing the third touch sensor electrode 302c, as illustrated in FIG. 10B.

In the touch sensor electrode 302 according to the present example illustrated in FIG. 10B, dogleg shaped gradient shapes are formed from the touch sensor electrode 302b toward the adjacent touch sensor electrodes 302a and 302c.

Accordingly, when performing slide operations, the input values of capacitance of touch sensor electrodes can be gradually transitioned to adjacent electrodes, so operations with linearity secured can be performed. The apices of the dogleg shaped gradient shapes are situated at the general middle of the touch sensor electrode 302 in the Y direction, in the touch sensor electrode 302 according to the present example illustrated in FIG. 10B, and the angles θ1 and θ2 of the apices are set to be generally 90 degrees.

However, it should be noted that these are preferable setting values in a case where the electrode is rectangular shape long in the X direction as in the present example, and in a case where the shape of the electrode is close to a square, the angle of the apices should be obtuse.

The sub-electronic dial 73 is provided at a position recessed to the front side of the imaging apparatus (Z direction) in comparison with the touch face 401 of the touch bar 82, as illustrated in FIG. 10B. However, the step in the Z direction between the touch face 401 of the touch bar 82 and the contact face of turning the sub-electronic dial 73 with the thumb of the right hand is small. Accordingly, there is the possibility of unintentionally touching the adjacent touch bar 82 when operating the sub-electronic dial 73.

In the present example in FIG. 10B, the sub-electronic dial 73 is provided at a position recessed to the front side of the imaging apparatus (Z direction) in comparison with the touch face 401 of the touch bar 82. However, an arrangement where the sub-electronic dial 73 is provided at a position protruding to the rear side of the imaging apparatus (Z direction) in comparison with the touch face 401 of the touch bar 82 is also included in the present disclosure.

The step between the touch face 401 of the touch bar 82 and the contact face of turning the sub-electronic dial 73 with the thumb of the right hand, protruding toward the rear side (Z direction) is small. Accordingly, there is the possibility of unintentionally touching the adjacent touch bar 82 with the thumb of the right hand when operating the sub-electronic dial 73.

The sub-electronic dial 73 is a rotational operating member that uniaxially rotates in the X direction with the Y direction as the axis of rotation.

When viewing the imaging apparatus (electronic equipment) from the rear side, the touch bar 82 serving as a first operating member overlaps the operating face of the display unit 28 serving as a display unit, in the slide operation direction (X direction). The touch bar 82 serving as a first operating member does not overlap the operating face of the display unit 28 serving as a display unit, in a direction orthogonal to the slide operation direction (Y direction).

When viewing the imaging apparatus (electronic equipment) from the rear side, the touch bar 82 is situated at a position recessed to the front side (X direction) as to the operating face of the display unit 28. However, the step in the Z direction between the operating face (touch face) of the touch bar 82 and the operating face (touch face) of the display unit 28 is relatively great. Accordingly, when operating the display unit 28, the possibility of the thumb unintentionally touching the adjacent touch bar 82 is low.

In the present example, the step in the Z direction between the touch face of the touch bar 82 and the touch face of the display unit 28 is greater than the step in the Z direction between the touch face of the touch bar 82 and the contact face for turning the sub-electronic dial 73.

A line segment A is defined extending in the direction of slide operations, and passing through midpoints of the short sides of the touch detecting face of the touch sensor electrode 302 serving as the detecting unit. In this case, a region of the N'th touch sensor electrode 302n that is closer to the sub-electronic dial 73 with the line segment A as a reference is a first region. With the region of the N'th touch sensor electrode 302n on the side closer to the display unit (touch panel) 28 as a second region, the surface area of the first region is narrower than the surface area of the second region.

Figure 11:
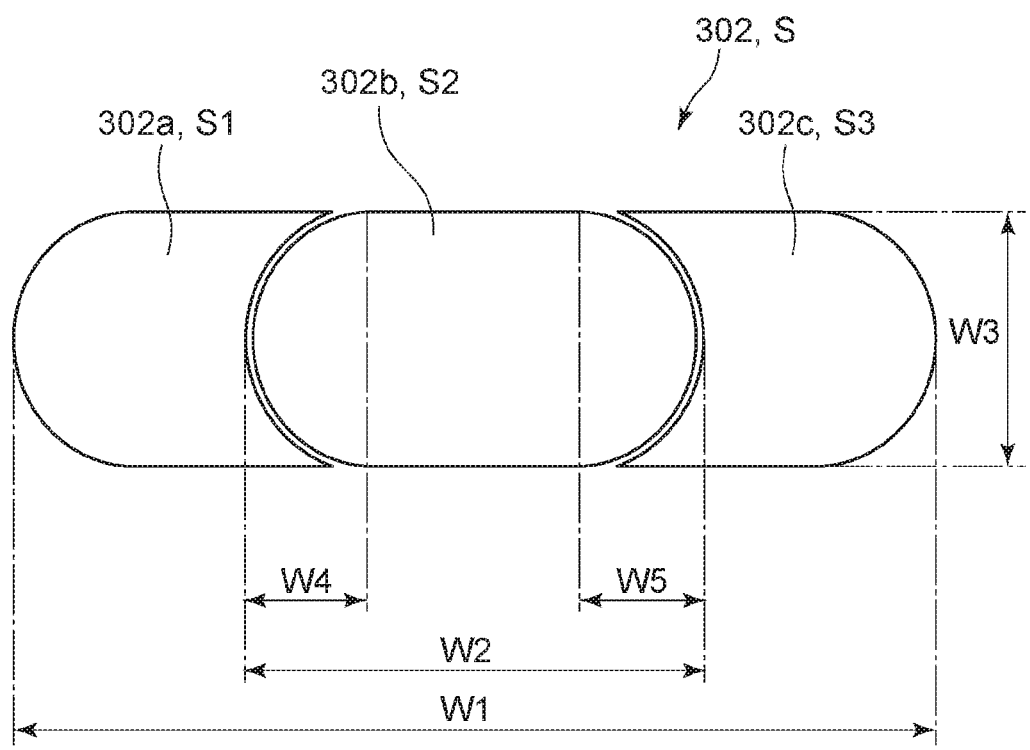
FIG. 11 illustrates an example of the shape of a touch sensor electrode.

FIG. 11 is an example of the shape of the touch sensor electrode 302. Although the shape of the touch sensor electrode 302 has been described as being rectangular in the first and second examples, this is not restrictive, and the touch sensor electrode 302 may be an oval long in the horizontal direction, as illustrated in FIG. 11. The definitions of W1, W2, W3, W4, and W5 are the same as in the first and second example.

Although an embodiment of the present disclosure has been described, the present embodiment is not restricted to this embodiment, and various modifications and alterations may be made within the scope of the essence thereof.

Also, although description has been made where the size of a touch sensor electrode is the planar surface area, for example, ease of input may be adjusted by three-dimensional shapes, such as curved shapes, uneven shapes, and so forth.

The electronic equipment according to the present disclosure is not restricted to a digital camera that is an imaging apparatus, and may be applied to photocopiers, laser beam printers (LBP), and ink jet printers as well. The touch bar according to the present disclosure may be used for a touch operating face where numbers of copies, size of copy paper sheets, and so forth, are changed by touch operations/slide operations, while holding a monitor.

The present disclosure is also applicable to mobile devices such as smartphones, tablet computers, smart watches, and other like portable small-sized computers. The touch bar according to the present disclosure may be disposed outside of the screen of the mobile device and can be used for touch operations/slide operations for image feeding, selecting, and so forth.

Further, the present disclosure is also applicable to automotive, medical equipment, and gaming usages. The touch bar according to the present disclosure may be disposed on the steering wheel of an automobile, so as to enable menu switching by touch operations, or fine adjustment of audio level, zooming in/out an automotive navigation screen, and so forth by slide operations, while steering the automobile. In medical equipment usages, the touch bar according to the present embodiment may be disposed on a holding portion of a handy X-ray device, to enable fine adjustment by slide operations.

According to the present disclosure, electronic equipment can be provided having realized a size of a detecting face where both tap operations and full-area pressing operations can be realized without erroneous operations.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-125511, filed Jun. 29, 2018, which is hereby incorporated by reference herein in its entirety.

What is claimed is:

1. Electronic equipment comprising:
a first operating member having a detecting unit configured to detect a touch operation and a slide operation,
wherein, in a case where a touch detecting face of the detecting unit is touched in the touch operation over a first predetermined and a second predetermined area or less, a first function is executed, wherein the second predetermined area is larger than the first predetermined area,
wherein, in a case where the touch detecting face of the detecting unit is touched in the touch operation over more than the second predetermined area, a second function that differs from the first function is executed
wherein the touch detecting face of the detecting unit is divided into a first touch detecting face, a second touch detecting face, and a third touch detecting face, in that order in a direction of the slide operation, and
wherein a relation of $$1.4 \leq W1/W2 \leq 6.0$$

is satisfied,
where W1 represents a length of the touch detecting face of the detecting unit in the direction of the slide operation, and W2 represents a length of the second touch detecting face in the direction of the slide operation.

2. The electronic equipment according to claim 1, wherein the length W1 of the touch detecting face of the detecting unit in the direction of the slide operation satisfies 7 mm≤W1≤30 mm.

3. The electronic equipment according to claim 1,
wherein the length W2 of the second touch detecting face in the direction of the slide operation satisfies 5 mm≤W2≤20 mm.

4. The electronic equipment according to claim 1, wherein the relation of $$W2 \geq W3,$$

is satisfied,
where W2 represents the length of the second touch detecting face in the direction of the slide operation, and W3 represents a length of the second touch detecting face in a direction orthogonal to the direction of the slide operation.

5. The electronic equipment according to claim 1,
wherein the second touch detecting face and the first touch detecting face overlap in the direction of the slide operation, and
wherein a relation of $$1.8 \leq W3/W4 \leq 2.2$$

is satisfied,
where W3 represents the length of the second touch detecting face in a direction orthogonal to the direction of the slide operation, and W4 represents an amount of overlap of the second touch detecting face and the first touch detecting face in the direction of the slide operation.

6. The electronic equipment according to claim 1,
wherein the second touch detecting face and the third touch detecting face overlap
in the direction of the slide operation, and
wherein a relation of $$1.8 \leq W3/W5 \leq 2.2$$

is satisfied,
where W3 represents the length of the second touch detecting face in a direction orthogonal to the direction of the slide operation, and W5 represents an amount of overlap of the second touch detecting face and the third touch detecting face in the direction of the slide operation.

7. The electronic equipment according to claim 1, wherein a relation of $$2 \leq W1/W2 \leq 3$$

is satisfied,
where W1 represents the length of the touch detecting face of the detecting unit in the direction of the slide operation, and W2 represents the length of the second touch detecting face in the direction of the slide operation.

* * * * *